Figure 1:
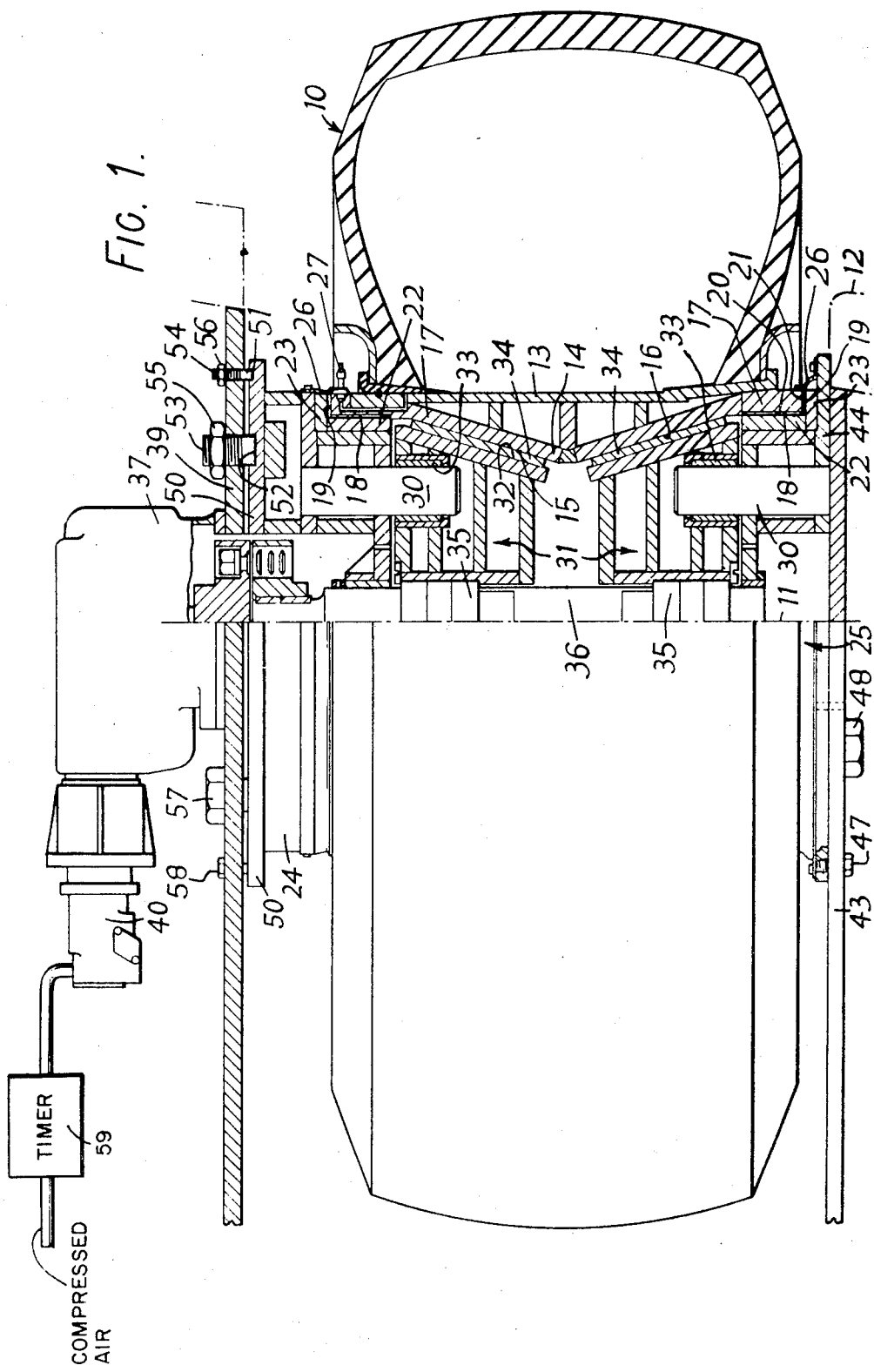

United States Patent [19]
Duncan et al.

[11] 3,724,413
[45] Apr. 3, 1973

[54] ROTATABLE FENDERS

[75] Inventors: John Duncan, Giles; Graham Arthur Nigel Hart, Aylesbury, both of England

[73] Assignee: Heisband's Shipyards Limited, Marchwood, England

[22] Filed: Aug. 25, 1970

[21] Appl. No.: 66,780

[30] Foreign Application Priority Data

Sept. 19, 1969 Great Britain.................46,405/69

[52] U.S. Cl..............................................114/220
[51] Int. Cl. ..............................................B63b 21/56
[58] Field of Search ..........114/219, 220; 293/17, 19; 188/73.2, 72.8, 72.7, 71.5

[56] References Cited

UNITED STATES PATENTS

| 2,943,827 | 7/1960 | Hartel et al.............................244/111 |
| 2,021,266 | 11/1935 | Shelor..............................188/73.2 X |
| 2,045,593 | 6/1936 | Frankland........................188/72.8 X |
| 2,091,586 | 8/1937 | Glacy..............................188/72.8 X |

FOREIGN PATENTS OR APPLICATIONS

| 701,606 | 12/1953 | Great Britain........................114/220 |
| 764,276 | 12/1956 | Great Britain........................114/220 |

*Primary Examiner*—Milton Buchler
*Assistant Examiner*—Gregory W. O'Connor
*Attorney*—Ernest A. Greenside

[57] ABSTRACT

A fender, primarily for marine use, comprises a tyred wheel rotatably mounted in a support structure and clutch means operable to prevent rotation of the wheel. The clutch means comprises a pair of opposed, externally frusto-conical clutch elements which are movable in unison into and out of engagement with respective complementary internally frusto-conical surfaces formed in the hub of the wheel. The clutch means includes a device for automatically taking up the wear on the clutch faces.

6 Claims, 2 Drawing Figures

ROTATABLE FENDERS

This invention relates to rotatable fenders intended primarily but not exclusively for tugs and like vessels which are used to maneuver other vessels by pushing them.

According to this invention, there is provided a rotatable fender comprising a tired wheel mounted for rotation about a fixed axis and having a hub which rotates with the wheel, and a clutch including two internal annular frustoconical clutch surfaces which are provided by the hub and are centered on said axis and which face in axially opposite directions, two clutch elements having external annular frusto-conical clutch surfaces respectively co-operating with said internal clutch surfaces which elements are fixed against rotation about said axis but are guided for axial movement, and clutch operating means for moving the clutch elements towards and away from each other in unison for operating the clutch. Preferably the clutch operating means is actuated by a motor.

According to a preferred feature of the invention, the clutch operating means comprises two nuts respectively connected to the two clutch elements which nuts have opposite handed threads, and a shaft having respective threaded portions in screw engagement with the nuts, said motor being connected to rotate the shaft selectively in either direction.

According to another preferred feature of the invention, control means for controlling the operation of the clutch is adapted to engage the clutch by running the motor until the clutch elements are in full tight engagement with the internal clutch surfaces on the hub and the motor stalls. In this case the motor is preferably a fluid operated rotary motor so as not to be adversely affected by operating under stalling conditions.

Conveniently the fender may include means for automatically compensating for wear on the clutch surfaces.

According to a preferred feature of the invention, the automatic wear-compensating means comprises means adapted, on initiation of operator of operation of the motor to disengage the clutch, to back off the clutch elements from a position of full, tight engagement with the internal clutch surfaces for a first predetermined interval of time and, on initiation of operation of the motor to engage the clutch, to move the clutch elements for a second predetermined interval of time from this fully disengaged position in a sense to engage the clutch, said second time interval being longer than said first time interval.

Figure 2:
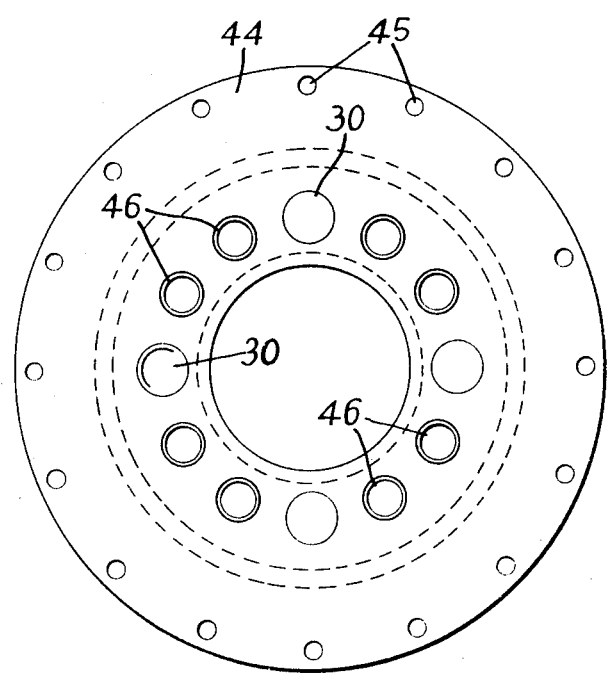

One embodiment of the invention will now be described by way of example with reference to the accompanying drawings in which:

FIG. 1 shows, half in axial section, a pneumatic bow fender according to the invention, and FIG. 2 is an inverted plan of the base support member of the fender.

Referring to the drawings, the fender is mounted in the bow of a tug and includes a pneumatic tired wheel 10 mounted for rotation about a vertical axis 11 and arranged so that the tire projects forwardly beyond the stem 12 of the tug.

The wheel has a hub 13 within which is secured, as by welding, a fabricated convergent-divergent element 14 providing two internal axially outwardly facing, frusto-conical clutch faces 15, 16. Also welded to the hub are two bearings rings 17 which are disposed at opposite ends of the hub. Each of these rings has an internal bearing surface 18 and an axially outwardly facing bearing surface 19 which are respectively engaged by complementary plain surfaces 20, 21 of a journal ring 22 and a thrust ring 23. The upper rings 22 and 23 are secured to a fixed upper support member 24 and the lower rings are secured to a generally similar base support member 25. The bearings are protected against the ingress of water by seals 26.

The hub has two inflation valves 27 which communicate with the interior of the tire through passages in the upper bearing ring 17.

Each of the two support members 24, 25 carries a set of four guide pins 30 which project axially into the hub and a clutch member 31 having an external frusto-conical surface 32 is supported for axial sliding movement on these four guide pins, the member having having bushes 33 in which the guide pins engage. The surfaces 32 of the clutch members are respectively complementary to the faces 15, 16 of element 14 and intermediate clutch linings 34 are provided which are secured to the members 31.

Each of the clutch members 31 has a nut 35 secured within it, and the screw threads of the two nuts are of opposite hand to each other. A central shaft 36 has opposite-handed screw portions respectively engaged within the two screws so as to support the members 31 and is journalled in the two support members 24, 25. The upper end of the shaft 36 is driven by the output shaft of a reduction gear mechanism 37 mounted on the deck 39 of the tug, and the input shaft of mechanism 37 is driven by a reversible compressed air motor 40.

The wheel and the two support members are disposed between the deck and a generally horizontal support plate 43 spaced below the deck. To secure the fender in position the bottom flange 44 of support member 25 is provided with an outer ring of threaded holes 45, and an inner ring of eight larger threaded holes 46 which are on the same pitch circle as the guide pins 30. Bolts 47, 48 extend through drillings in the plate 43 into the holes 45, 46 and hold the support member 25 rigidly against plate 43. The top flange 50 of support member 24 has an outer pitch circle along which screw-threaded holes alternate with shallow recesses 51, and an inner pitch circle in which screw-threaded holes alternate with shallow recesses 52. The deck has threaded holes aligned with the recesses and plain holes aligned with the screwed holes in flange 50, and threaded studs 53, 54 having hexagonal sockets in their upper ends carry lock nuts 55, 56 and project into the recesses 51 and 52. These studs are arranged to press the entire fender assembly downward against support plate 43, and bolts 57, 58 are then screwed into the threaded holes in the flange 50 to hold the flange and the deck against relative vertical movement and, with the studs, resist the tendency of the support plate to rotate whel the wheel is rotating and the clutch is being engaged to stop the wheel.

When the tug is pushing another vessel the wheel is held stationary, the clutch being fully engaged. When it is desired to move the point of application of the push, the clutch is disengaged and the helm put over, and the tug will then move sideways, the wheel rolling along the side of the other vessel, until the fresh point of application is reached when the clutch is engaged to stop the wheel. Thus the need to back the tug off is avoided. In addition the pneumatic tire of the wheel spreads the load applied to the other vessel.

The clutch is applied by driving motor 40 in one direction so that clutch members 31 are moved towards each other by virtue of the engagement of their respective nuts 35 with the screw threads on the shaft so that the members engage the respective internal clutch faces 15, 16. It is of course essential for the wheel to become locked to the members 31 and for this reason the members 31 and element 14 constitute a clutch rather than a brake. To disengage the clutch, the motor is reversed.

In order to provide for automatic adjustment to compensate for wear on the clutch linings, a timing mechanism 59 is incorporated in the controls of the motor such that when the clutch is to be disengaged compressed air is supplied to the motor for a predetermined interval of time, and when the clutch is next engaged, compressed air is supplied to the motor for a predetermined longer time interval. The motor thus tends always to move the clutch members further in the engaging than in the disengaging direction, and is arranged always to reach a stalling point, indicative of full engagement of the clutch, at or before the expiry of the time set for operation of the motor to engage the clutch.

We claim:

1. A fender comprising a tired wheel mounted for rotation about a vertical axis and having a hub which rotates with the wheel about said axis, a clutch mechanism having a first pair of annular frustoconical relatively immovable clutch surfaces provided by the hub and rotatable in unison therewith about said axis, said clutch mechanism having a second pair of annular frusto-conical clutch surfaces fixed against rotation about said axis but mounted for axial movement toward and away from one another for respectively engaging and disengaging said first pair of surfaces, and means for so moving said second pair of surfaces relative to said first pair of surfaces.

2. A fender according to claim 1, wherein said tired wheel is adapted for predetermined positioning about said axis upon disengagement of said second pair of surfaces from said first pair of surfaces and upon attainment of a predetermined position in its range of movement about said axis of said tired wheel, said means is operated to engage said clutch surfaces.

3. A fender according to claim 1, mounted to a tug between its upper deck and a generally horizontal support plate, spaced below the deck.

4. A fender according to claim 3, wherein the fender has upper and lower support members respectively fixed to the deck and said support plate, each of said support members carrying guide means which project axially into the hub, each of said second pair of surfaces being supported for axial sliding movement on said guide means.

5. A fender as claimed in claim 1, wherein the last-named means comprises a pair of nuts operatively connected to the second pair of clutch surfaces of the clutch mechanism, said nuts having opposite handed threads, a shaft having respective threaded portions in screw engagement with the nuts, and a motor connected to rotate the shaft selectively in either direction.

6. A fender as claimed in claim 5, comprising timing means effective to operate said motor for a first period of time in one direction and for a second period of time longer than the first period in an opposite direction.

* * * * *

UNITED STATES PATENT OFFICE
CERTIFICATE OF CORRECTION

Patent No. 3,724,413    Dated April 3, 1973

Inventor(s) DUNCAN, JOHN, ET. AL.

It is certified that error appears in the above-identified patent and that said Letters Patent are hereby corrected as shown below:

On the cover sheet [73], "Heisband's Shipyards Limited," should read -- Husband's Shipyards Limited, -- .

Signed and sealed this 25th day of December 1973.

(SEAL)
Attest:

EDWARD M. FLETCHER, JR.
Attesting Officer

RENE D. TEGTMEYER
Acting Commissioner of Patents